United States Patent
Liang et al.

(10) Patent No.: US 12,062,812 B2
(45) Date of Patent: Aug. 13, 2024

(54) BATTERY MODULE AND METHOD AND EQUIPMENT FOR MANUFACTURING THE SAME, BATTERY PACK, AND APPARATUS

(71) Applicant: Contemporary Amperex Technology Co., Limited, Ningde (CN)

(72) Inventors: Chengdu Liang, Ningde (CN); Xia Hu, Ningde (CN); Yonghuang Ye, Ningde (CN); Qian Liu, Ningde (CN); Quanguo Li, Ningde (CN); Wei Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 360 days.

(21) Appl. No.: 17/557,003

(22) Filed: Dec. 20, 2021

(65) Prior Publication Data
US 2022/0115746 A1 Apr. 14, 2022

Related U.S. Application Data (63) Continuation of application No. PCT/CN2021/089666, filed on Apr. 25, 2021.

(30) Foreign Application Priority Data

Apr. 30, 2020 (CN) .......................... 202010368378.2
Aug. 1, 2020 (CN) ......................... 202010763172.X (51) Int. Cl.
*H01M 50/51* (2021.01)
*B60L 50/64* (2019.01)
(Continued)

(52) U.S. Cl.
CPC ............. *H01M 50/51* (2021.01); *B60L 50/64* (2019.02); *H01M 10/0413* (2013.01);
(Continued)

(58) Field of Classification Search
None
See application file for complete search history.

(56) References Cited

U.S. PATENT DOCUMENTS

2016/0240849 A1* 8/2016 Kuriyama ........... H01M 50/209
2020/0014000 A1 1/2020 Roddy et al.

FOREIGN PATENT DOCUMENTS

CN 101005147 A 7/2007
CN 201749897 U 2/2011
(Continued)

OTHER PUBLICATIONS

The International search report for PCT Application No. PCT/CN2021/089666, dated Jul. 22, 2021, 14 pages.
(Continued)

*Primary Examiner* — Wyatt P McConnell
(74) *Attorney, Agent, or Firm* — East IP P.C.

(57) ABSTRACT

The present application relates to a battery module and a method and equipment for manufacturing the same, a battery pack, and an apparatus. The battery module includes Type 1 battery cells and Type 2 battery cells connected in series; the Type 1 battery cells and the Type 2 battery cells satisfy the following criteria: $1.01 \times C_1/C_2 \leq N_2 \leq 1.25$, and $C_1 < C_2$, where $N_2$ is a battery charge balance rate of the Type 2 battery cells; $C_1$ and $C_2$ are respectively capacities of the Type 1 battery cells and the Type 2 battery cells. By a reasonable combination of chemical systems of battery cells with different capacities, the battery module of the present application can have good safety and stability while achieving the battery cells with different capacities each having high energy output characteristics during charging and discharging, thereby increasing the energy density of the battery module.

20 Claims, 3 Drawing Sheets (51) Int. Cl.
  *H01M 10/04* (2006.01)
  *H01M 10/0525* (2010.01)
  *H01M 50/209* (2021.01)
  *H01M 50/249* (2021.01)
  *H01M 50/258* (2021.01)

(52) U.S. Cl.
  CPC ..... *H01M 10/0525* (2013.01); *H01M 50/209* (2021.01); *H01M 50/249* (2021.01); *H01M 50/258* (2021.01); *H01M 2220/20* (2013.01)

(56) References Cited

FOREIGN PATENT DOCUMENTS

| | | |
|---|---|---|
| CN | 102027617 A | 4/2011 |
| CN | 103208655 A | 7/2013 |
| CN | 103441305 A | 12/2013 |
| CN | 103515644 A | 1/2014 |
| CN | 103988356 A | 8/2014 |
| CN | 104090239 A | 10/2014 |
| CN | 105375071 A | 3/2016 |
| CN | 105993089 A | 10/2016 |
| CN | 106133980 A | 11/2016 |
| CN | 108777329 A | 11/2018 |
| CN | 109148820 A | 1/2019 |
| CN | 109273771 A | 1/2019 |
| CN | 110007245 A | 7/2019 |
| CN | 209487559 U | 10/2019 |
| CN | 111008478 A | 4/2020 |
| DE | 102012215495 A1 | 3/2014 |
| JP | 2013037862 A | 2/2013 |

OTHER PUBLICATIONS

The First Office Action for Chinese Application No. 202010763172.X, dated Oct. 25, 2022, 18 pages.
The extended European search report for EP Application No. 21790350.9, dated Nov. 18, 2022, 11 pages.
The partial supplementary extended European search report for EP Application No. 21790350.9, dated Aug. 18, 2022, 13 pages.
The Third Office Action for Chinese Application No. 202010763172.X, dated Jun. 21, 2023, 12 pages.
Bingkun Guo et al. Lithium Ion Battery, dated May 31, 2003, 5 pages.

\* cited by examiner

BATTERY MODULE AND METHOD AND EQUIPMENT FOR MANUFACTURING THE SAME, BATTERY PACK, AND APPARATUS

CROSS-REFERENCE TO RELATED APPLICATION

This application is a continuation of International Application No. PCT/CN2021/089666, filed on Apr. 25, 2021, which claims priority to Chinese Patent Application No. 202010368378.2 filed on Apr. 30, 2020, and Chinese Patent Application No. 202010763172.X filed on Aug. 1, 2020, all of which are incorporated herein by reference in their entireties.

TECHNICAL FIELD

This application belongs to the technical field of batteries, and specifically relates to a battery module and a method and equipment for manufacturing the same, a battery pack, and an apparatus.

BACKGROUND

Lithium-ion batteries (also known as lithium batteries) are a kind of clean energy and renewable resources. They are widely used in the fields of hand-held tools, small electronic terminal products, new energy vehicles and the like as driving power sources or capacity storage units. Different application scenarios usually have different requirements to the performance of lithium batteries. For example, as for power lithium-ion batteries used in new energy vehicles, their working voltage and energy density directly determine the endurance, charging performance, acceleration performance, safety performance and the like of the new energy vehicles.

Since lithium-ion batteries are used as driving power sources or large-capacity storage units, a plurality of battery units (i.e. battery cells) need to be connected in series/parallel to obtain a battery module (or battery pack). Therefore, how to ensure the consistency of charge and discharge of the plurality of battery cells in the battery module (or battery pack) during long-term use, while achieving high energy output characteristics and good safety performance of the battery module at the same time becomes one of the urgent issues to be solved in the field of lithium-ion battery research.

SUMMARY

Since lithium-ion batteries are used as driving power sources or large-capacity storage units, a plurality of battery units (i.e. battery cells) need to be connected in series/parallel to obtain a battery module (or battery pack). However, due to the variability of the manufacturing process, the actual charge and discharge performance parameters of battery cells are different from initial design parameters. This difference will be gradually magnified during long-term charge and discharge, and easily leads to inconsistent charge and discharge characteristics of the plurality of battery cells in the same battery module (or battery pack). Meanwhile, in the same battery module (or battery pack), when the battery cells with little difference in initial design parameters are at different positions of a vehicle or an energy storage system, the capacity attenuation characteristics of the battery cells may also be quite different during long-term charge and discharge because of the inconsistency in conditions of ambient temperature, external force, etc.

The applicant found: in order to increase the energy output of a battery module, a plurality of battery cells always need to be fully charged and discharged. Therefore, when the designs of the battery charge and discharge characteristics of the battery cells in the battery module (or battery pack) do not match, some battery cells are easily overcharged and over-discharged due to the fact that the charge/discharge process of the battery pack follows the "buckets effect", which leads to lithium precipitation in these battery cells to cause safety risks. However, if the battery cells with charge and discharge performance "short-board" are used as the upper and lower limits of charge and discharge of the battery module in order to avoid the safety risks, a relatively large impact will be produced on the energy output performance of the battery module (or battery pack).

Therefore, the present application provides a battery module, including Type 1 battery cells and Type 2 battery cells, the Type 1 battery cells and the Type 2 battery cells satisfy the following criteria:

$$1.01 \times C_1/C_2 \le N_2 \le 1.25, \text{ and } C_1 < C_2,$$

where $N_2$ is a battery charge balance rate of the Type 2 battery cells; $C_1$ and $C_2$ are respectively capacities of the Type 1 battery cells and the Type 2 battery cells.

In the present application, matching the capacity and charge and discharge characteristics of the Type 1 battery cells and the Type 2 battery cells effectively ensures the safety performance of a battery module including a plurality of battery cells with different battery design parameters, greatly reduces the risk of lithium precipitation in the battery module, and also ensures high energy output characteristics of the plurality of battery cells with different battery design parameters.

The present application further provides a battery pack, including the battery module of the present application. The battery pack also has relatively high energy output characteristics in addition to good safety performance.

The present application further provides an apparatus, including the battery module or the battery pack of the present application, wherein the battery module or battery pack is used to provide power supply for the apparatus and/or used as an energy storage unit of the apparatus.

The present application further provides a method for manufacturing a battery module, including the following steps:

obtaining Type 1 battery cells and Type 2 battery cells; and connecting the Type 1 battery cells and the Type 2 battery cells in series to form the battery module, wherein the Type 1 battery cells and the Type 2 battery cells satisfy the following criteria:

$$1.01 \times C_1/C_2 \le N_2 \le 1.25, \text{ and } C_1 < C_2,$$

where $N_2$ is a battery charge balance rate of the Type 2 battery cells; $C_1$ and $C_2$ are respectively capacities of the Type 1 battery cells and the Type 2 battery cells.

In the present application, the balanced assembly of the battery cells and connection thereof improves the safety and stability of the battery module, ensures relatively high energy output characteristics of the battery module, and effectively reduces the risk of lithium precipitation in the battery module composed of battery cells with different battery design parameters during charge and discharge.

The present application further provides an equipment for manufacturing a battery module, including a processor, the processor configured to control a clamp arm to obtain Type 1 battery cells and Type 2 battery cells;

the processor further configured to control assembly components to connect the Type 1 battery cells and the Type 2 battery cells in series to form the battery module;

where the Type 1 battery cells and the Type 2 battery cells satisfy the following criteria:

$$1.01 \times C_1/C_2 \leq N_2 \leq 1.25, \text{ and } C_1 < C_2,$$

wherein, $N_2$ is a battery charge balance rate of the Type 2 battery cells; $C_1$ and $C_2$ are respectively capacities of the Type 1 battery cells and the Type 2 battery cells.

In the present application, the manufacturing equipment including the above-mentioned mechanism can ensure that the manufactured battery module has good safety and stability and relatively high energy output characteristics at the same time, and reduce the risk of lithium precipitation in the battery module assembled from battery cells with different battery design parameters.

DESCRIPTION OF THE DRAWINGS

To explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

In the drawings, reference numerals are explained as follows:

1—battery pack
2—upper case
3—lower case
4—battery module
5—battery cell

DETAILED DESCRIPTION

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

The technical solution proposed in the present application is:

In a first aspect, the present application proposes a battery module, including Type 1 battery cells and Type 2 battery cells connected in series.

The Type 1 battery cells and the Type 2 battery cells satisfy the following criteria:

$$1.01 \times C_1/C_2 \leq N_2 \leq 1.25, \text{ and } C_1 < C_2,$$

where $N_2$ is a battery charge balance rate of the Type 2 battery cells; $C_1$ and $C_2$ are respectively capacities of the Type 1 battery cells and the Type 2 battery cells.

Battery Cell

Figure 1:
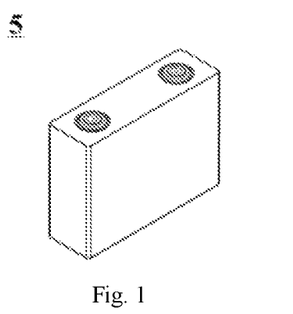
FIG. 1 is a schematic diagram of Type 1 battery cells or Type 2 battery cells according to an embodiment of the present application.

In the present application, "battery cell" refers to a battery unit that can be independently charged and discharged. The present application does not have particular limitation on the shape of the battery cell. The battery cell may be cylindrical, square, or in other arbitrary shape. FIG. 1 shows a battery cell 5 with a square structure as an example.

In some embodiments, the battery cell may include an outer package for packaging a positive electrode plate, a negative electrode plate and an electrolyte.

In some embodiments, the outer package of the battery cell may be a soft bag, such as a pocket type soft bag. The material of the soft bag may be plastic, for example, it may include one or more of polypropylene (PP), polybutylene terephthalate (PBT), polybutylene succinate (PBS), and the like. The outer package of the battery cell may also be a hard case, such as a hard plastic case, an aluminum case, or a steel case.

Figure 2:
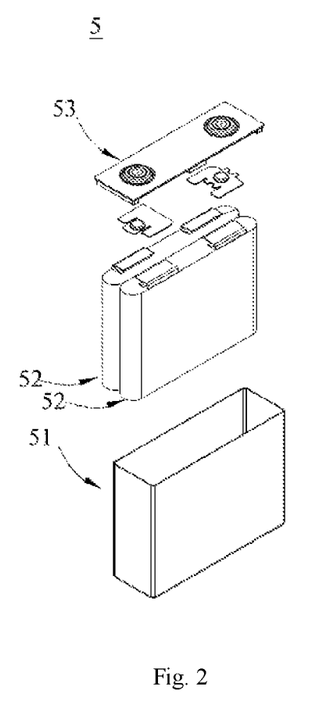
FIG. 2 is an exploded view of FIG. 1.

In some embodiments, referring to FIG. 2, the outer package may include a case 51 and a cover plate 53. The case 51 may include a bottom plate and side plates connected to the bottom plate, and the bottom plate and the side plates enclose an accommodating cavity. The case 51 has an opening communicated with the accommodating cavity, and the cover plate 53 can cover the opening to seal the accommodating cavity.

A positive electrode plate, a negative electrode plate and a separator may be laminated or wound to form a laminated electrode assembly or a wound electrode assembly. The electrode assembly 52 is packaged in the accommodating cavity. The electrolyte may be an electrolyte solution, and the electrolyte solution infiltrates the electrode assembly 52.

The battery cell 5 may include one or more electrode assemblies 52, which can be adjusted according to requirements.

In the present application, the capacity of the battery cell is a well-known meaning in the art, and can be tested by a conventional method. As an example, the test may be carried out by the following method: the battery cell is charged/discharged at room temperature (25° C.), at a constant current rate of 0.33C, and within a working voltage range specified in the GBT certification document, to measure a discharge capacity of the battery cell, which denoted as the capacity of the battery cell described in the present application. The charge/discharge rate is a ratio of a charge/discharge current to a rated capacity of the battery cell. The rated capacity should be the capacity of the battery cell, or the battery module to which the battery cell belongs, or the battery pack to which the battery cell belongs identified in the GBT certification document. Specifically, the process of testing the capacity of the battery cell is as follows: 1) the battery cell is first fully discharged, charged to an upper cut-off voltage at a constant current rate of 0.33C, charged at a constant voltage until the current is less than 0.05C; 2) set standing for 10 mins; and 3) discharged to a lower cut-off voltage at the constant current rate of 0.33C. The measured discharge capacity of the battery is denoted as the capacity of the battery cell described in the present application.

In the present application, the Type 1 battery cells and the Type 2 battery cells are classified by the capacities of the battery cells. The capacity of each battery cell in the battery module is tested according to the above-mentioned method for testing the capacity of the battery cells. The battery cells whose capacity deviations are not greater than 1.5% are classified into a type of battery cells, and an average value of the capacities of the battery cells in this type of battery cells is determined and denoted as the capacity of this type of battery cells. When there are two or more types of battery cells in the battery module, the type of battery cells with a smaller average capacity is defined as Type 1 battery cells, and the type of battery cells with a larger average capacity is defined as Type 2 battery cells. Those skilled in the art can understand that, all the battery modules satisfying "$1.01 \times C_1/C_2 \leq N_2 \leq 1.25$", which is obtained by connecting the battery cells with different capacities in series, fall within the protection scope of the present application.

In the present application, "the Type 1 battery cells and the Type 2 battery cells connected in series" refers to at least one of the Type 1 battery cells is electrically connected to at least one of the Type 2 battery cells in series. Namely, the case where at least one of the Type 1 battery cells is/are connected to at least one of the Type 2 battery cells in series falls into the scope of the present application, the connection relationship between other Type 1 battery cells and other Type 2 battery cells is not limited, neither the connection relationship of the Type 1 battery cells nor the connection relationship of the Type 2 battery cells is limited.

As is well known to those skilled in the art, the battery charge balance rate N of the battery cell refers to a ratio of a charge capacity per unit area of a negative electrode plate to a charge capacity per unit area of a positive electrode plate in the battery cells. In the present application, the battery charge balance rate reflects a relative amount of active lithium in the battery cell and vacancies for intercalation and deintercalation during the charge/discharge of the battery cell. For example, in a lithium-ion secondary battery, when the battery cell is charged, lithium ions in the battery cell are deintercalated from a positive electrode and intercalated into a negative electrode. If the lithium-ions from the positive electrode are just completely intercalated into all the vacancies of the negative electrode, $N=1$; if the lithium-ions from the positive electrode cannot completely fill all the vacancies of the negative electrode, $N>1$; and if the vacancies of the negative electrode cannot completely accommodate all the lithium-ions, $N<1$.

Theoretically, when $N=1$, the vacancies in the negative electrode can just accommodate all the lithium-ions. When $N>1$, some of vacancies in the negative electrode of the battery cell cannot be used effectively, which increase the volume and weight of the battery cell instead, thereby reducing the mass energy density and the volume energy density of the battery cell. When $N<1$, the vacancies of the negative electrode cannot completely accommodate all the lithium-ions, and the lithium-ions will precipitate at the negative electrode in the form of lithium dendrites during discharge, resulting in the loss of lithium-ions. The growth of lithium dendrites may pierce the separator to cause short circuits between the positive electrodes and the negative electrodes, thereby affecting the cycle life of the battery and causing the risk of failure of the battery cell. However, lithium-ions undergo repeated intercalation and deintercalation between the positive and negative electrodes during the first formation of the lithium-ion battery and subsequent cyclic charge/discharge. Because the SEI film is continuously formed, decomposed and re-formed, irreversible loss of lithium-ions will inevitably occur during charge/discharge of the battery cell. Therefore, chemical systems of different types of battery cells are required to be adjusted so as to ensure that various battery cells in the battery module simultaneously have relatively high energy output characteristics and good safety performance.

The inventors found through research, when the Type 1 battery cells and the Type 2 battery cells, with different capacities in the battery module, are electrically connected in series, the Type 1 battery cells and the Type 2 battery cells will be charged and discharged synchronously, the Type 1 battery cells with lower capacity becomes "short boards" during the charge and discharge process, and when the battery module desires to achieve relatively high output characteristics, the Type 1 battery cells has the risk of overcharge or overdischarge. In the present application, the inventors define the range of the battery charge balance rate $N_2$ of the Type 2 battery cells used with the Type 1 battery cells, and the battery charge balance rate $N_2$ of the Type 2 battery cells with higher average capacity satisfies: $1.01 \times C_1/C_2 \leq N_2 \leq 1.25$. The battery charge balance rate $N_2$ of the Type 2 battery cells with higher capacity within the above range can avoid over-discharge and lithium dendrites in the Type 1 battery cells induced by excessive lithium ions in the Type 2 battery cells, which ensures the safety and stability of the battery cells and avoids the problems of low battery cell energy usage and high cost caused by the excessive capacity of the Type 2 battery cells. In addition, because of the reasonable selection of the battery cells and the reasonable matching between the vacancies of the positive and negative electrodes of the battery cells and the lithium-ions capacity, the problem of the excessive weight and the volume of the battery module due to the excessive vacancies of the positive and negative electrodes is also avoided.

In some embodiments, $1.01 \times C_1/C_2 \leq N_2 \leq 1.20$. In other embodiments, $1.01 \times C_1/C_2 \leq N_2 \leq 1.18$, or $1.01 \times C_1/C_2 \leq N_2 \leq 1.01$. When the capacities of the Type 1 battery cells and the Type 2 battery cells and the battery charge balance rate are within the above range, the weight and volume of the battery module can be further reduced, which provides more possibility for the application of the battery module in terms of high energy density.

In an embodiment of the present application, the relationship between the capacities of the Type 1 battery cells and the Type 2 battery cells may be further defined, that is, the capacity $C_1$ of the Type 1 battery cells and the capacity $C_2$ of the Type 2 battery cells satisfy: $C_2/C_1 \leq 1.2$. Especially, the capacity $C_1$ of the Type 1 battery cells and the capacity $C_2$ of the Type 2 battery cells satisfy: $C_2/C_1 \leq 1.1$. Further, $C_2/C_1 \leq 1.05$. When the capacity $C_1$ of the Type 1 battery cells and the capacity $C_2$ of the Type 2 battery cells satisfy the above range, the loss caused by the fact that the capacity of the Type 2 battery cells cannot be exhausted can be reduced on the premise that the energy density and safety performance of the battery module are improved.

In the present application, masses of active materials per unit area of the positive and negative electrode plates of the battery cell and charge capacities per gram of the positive and negative electrode plates of the battery cell in which the charge capacities per gram are tested as described below where each plate is assembled into a coin cell (hereinafter abbreviated as charge capacities per gram of the positive and negative electrode plates of the battery cell) are key indicators for the designs of chemical systems of the battery cell, and directly determine the range of the battery charge balance rate N of the battery cell. According to the formula: $N=WA \times BA/(WC \times BC)$, the inventors of the present application adjusted the battery charge balance rate N of the Type 1 battery cells and the Type 2 battery cells where WA is the mass of the active material per unit area of the negative electrode plate of the battery cell, in µg/mm²; BA is the charge capacity per gram of the negative electrode plate of the battery cell, in mAh/g; WC is the mass of the active material per unit area of the positive electrode plate of the battery cell, in µg/mm²; and BC is the charge capacity per gram of the positive electrode plate of the battery cell, in mAh/g. In the present application, by adjusting one or more variables in the masses of the active materials per unit area of the positive and negative electrode plates in the battery cell and the charge gram capacities of the positive and negative electrode plates, the Type 1 battery cells and the Type 2 battery cells can have different battery charge balance rates, so that the battery charge and discharge characteristics of the Type 1 battery cells and the Type 2 battery cells can be matched.

In some embodiments of the present application, the battery charge balance rate $N_1$ of the Type 1 battery cells is $N_1=WA_1 \times BA_1/(WC_1 \times BC_1)$ where, $WA_1$ is a mass of an active material per unit area of a negative electrode plate of the Type 1 battery cells, $BA_1$ is a charge capacity per gram of the negative electrode plate of the Type 1 battery cells, $WC_1$ is a mass of an active material per unit area of a positive electrode plate of the Type 1 battery cells, and $BC_1$ is a charge capacity per gram of the positive electrode plate of the Type 1 battery cells.

In some embodiments, the Type 1 battery cells satisfies at least one of the following conditions:

(1) The mass $WA_1$ of the active material per unit area of the negative electrode plate of the Type 1 battery cells is 60 µg/mm² $\leq WA_1 \leq$ 170 µg/mm²; in some examples, 80 µg/mm² $\leq WA_1 \leq$ 130 µg/mm²; and in other examples, 90 µg/mm² $\leq WA_1 \leq$ 120 µg/mm²;

(2) The charge capacity per gram $BA_1$ of the negative electrode plate of the Type 1 battery cells is 320 mAh/g $\leq BA_1 \leq$ 380 mAh/g;

(3) The mass $WC_1$ of the active material per unit area of the positive electrode plate of the Type 1 battery cells is 120 µg/mm² $\leq WC_1 \leq$ 280 µg/mm²; in some examples, 160 µg/mm² $\leq WC_1 \leq$ 210 µg/mm²; and in other examples, 163 µg/mm² $\leq WC_1 \leq$ 208 µg/mm²;

(4) The charge capacity per gram $BC_1$ of the positive electrode plate of the Type 1 battery cells is 100 mAh/g $\leq BC_1 \leq$ 230 mAh/g; in some examples, 125 mAh/g $\leq BC_1 \leq$ 200 mAh/g; and in other examples, 150 mAh/g $\leq BC_1 \leq$ 190 mAh/g.

In some embodiments, the Type 1 battery cells may satisfy the above conditions (1) to (4) at the same time. In the present application, when the Type 1 battery cells satisfies the above conditions (1) to (4) at the same time, the electrode plates are not easily cracked during manufacturing, which improves the safety performance of the battery cells; the battery cells have relatively high mass energy density and volume energy density; and the transmission path of lithium ions can be controlled to ensure that the battery cells have good power performance and to reduce the temperature rise of the battery cells during actual use.

In some embodiments of the present application, the battery charge balance rate $N_1$ of the Type 1 battery cells satisfies $0.9 \leq N_1 \leq 1.3$; and in some examples, $0.95 \leq N_1 \leq 1.2$. In the present application, when the battery charge balance rate of the Type 1 battery cells is within the above range, the utilization of the positive and negative active materials in the Type 1 battery cells can be further improved, which is conducive to increasing the volume energy density of the single battery cell and rendering the risk of lithium precipitation in the single battery cell to be relatively low.

In some embodiments of the present application, the battery charge balance rate $N_2$ of the Type 2 battery cells is $N_2=WA_2 \times BA_2/(WC_2 \times BC_2)$ where $WA_2$ is a mass of an active material per unit area of a negative electrode plate of the Type 2 battery cells, $BA_2$ is a charge capacity per gram of the negative electrode plate of the Type 2 battery cells, $WC_2$ is a mass of an active material per unit area of a positive electrode plate of the Type 2 battery cells, and $BC_2$ is a charge capacity per gram of the positive electrode plate of the Type 2 battery cells. In some embodiments, the Type 2 battery cells satisfies at least one of the following conditions:

(1) The mass $WA_2$ of the active material per unit area of the negative electrode plate of the Type 2 battery cells is 60 µg/mm² $\leq WA_2 \leq$ 170 µg/mm²; in some examples, 65 µg/mm² $\leq WA_2 \leq$ 120 µg/mm²; and in other examples, 85 µg/mm² $\leq WA_2 \leq$ 110 µg/mm²;

(2) The charge capacity per gram $BA_2$ of the negative electrode plate of the Type 2 battery cells is 320 mAh/g $\leq BA_2 \leq$ 380 mAh/g;

(3) The mass $WC_2$ of the active material per unit area of the positive electrode plate of the Type 2 battery cells is 300 µg/mm² $\leq WC_2 \leq$ 650 µg/mm²; in some examples, 190 µg/mm² $\leq WC_2 \leq$ 210 µg/mm²; and in other examples, 195 µg/mm² $\leq WC_2 \leq$ 208 µg/mm²;

(4) The charge capacity per gram $BC_2$ of the positive electrode plate of the Type 2 battery cells is 100 mAh/g $\leq BC_2 \leq$ 230 mAh/g.

In some embodiments, the Type 2 battery cells may satisfy the above conditions (1) to (4) at the same time. In the present application, when the Type 2 battery cells satisfies the above conditions (1) to (4) at the same time, the electrode plates are not easily cracked during manufacturing, which improves the safety performance of the battery cells; the battery cells have relatively high mass energy density and volume energy density; and the transmission path of lithium ions can be controlled to ensure that the battery cells have good fast charging performance.

In some embodiments of the present application, the battery charge balance rate $N_2$ of the Type 2 battery cells satisfies $0.8 \leq N_2 \leq 1.25$; and in some examples, $0.9 \leq N_2 \leq 1.18$.

In the present application, when the battery charge balance rate of the Type 2 battery cells is within the above range, the utilization of the positive and negative active materials in the Type 2 battery cells can be further improved, which is conductive to increasing the volume energy density of the single battery cell and rendering the risk of lithium precipitation in the single battery cell to be relatively low.

In some embodiments of the present application, the number of battery cells in the battery module is not particularly limited. The number of the Type 1 battery cells and the number of the Type 2 battery cells in the battery module can be adjusted according to the requirements of usage, so that the performance of the expected battery module can be further optimized. In the battery module, the number of the Type 1 battery cells is $n_1$, the number of the Type 2 battery cells is $n_2$, $n_1$ and $n_2$ are natural numbers, and the number $n_1$ of the Type 1 battery cells and the number $n_2$ of the Type 2 battery cells may satisfy: $0.01 \leq n_1/n_2 \leq 100$. In some examples, $0.05 \leq n_1/n_2 \leq 80$, $0.08 \leq n_1/n_2 \leq 50$, $0.1 \leq n_1/n_2 \leq 20$, or $0.1 \leq n_1/n_2 \leq 10$.

In some embodiments of the present application, in the battery module, the number of the Type 1 battery cells is $n_1$, the number of the Type 2 battery cells is $n_2$, $n_1$ and $n_2$ are natural numbers, and a total capacity of the Type 2 battery cells is from 10% to 60% of a total capacity of the battery module. In some examples, a total capacity of the Type 2 battery cells may be from 12% to 50%. That is: $10\% \leq n_2 \times C_2/(n_1 \times C_1 + n_2 \times C_2) \leq 60\%$. In some examples, $12\% \leq n_2 \times C_2/(n_1 \times C_1 + n_2 \times C_2) \leq 50\%$. When the total capacity of the Type 2 battery cells relative to the total capacity of the battery module is within the above range, the function of the Type 2 battery cells can be exerted as much as possible without affecting the performance of the Type 1 battery cells, thereby improving the overall performance of the battery module.

In some embodiments of the present application, the selection of chemical systems of the Type 1 battery cells and the Type 2 battery cells is the same as that of a conventional lithium-ion battery. In some examples, the chemical systems of the Type 1 battery cells and the Type 2 battery cells are independently selected from one of a lithium nickel cobalt manganese system, a lithium iron phosphate system, a lithium iron vanadium phosphate system, a lithium vanadium phosphate system, a lithium cobaltate system, a lithium nickelate system, a lithium-rich manganese system, a lithium nickel cobalt aluminum system, and a lithium manganate system.

In some embodiments of the present application, the chemical system of the Type 1 battery cells is one of a lithium nickel cobalt manganese system, a lithium cobaltate system, a lithium nickelate system, a lithium-rich manganese system, a lithium nickel cobalt aluminum system, and a lithium manganate system. The chemical system of the Type 2 battery cells is one of a lithium iron phosphate system, a lithium iron vanadium phosphate system, or a lithium vanadium phosphate system. In the present application, when the Type 1 battery cells and the Type 2 battery cells are the battery cells of different chemical systems, because the battery cells of different kinds of positive electrode active materials are different in terms of Coulombic Efficiency of first charge and discharge and long-term capacity attenuation trend, the assembly of the battery cells of different chemical systems can ensure relatively high safety performance and energy density of the battery module, and can also balance the advantages and disadvantages of different types of battery cells to further optimize the overall performance of the battery module.

In some examples, the Type 1 battery cells may be of a lithium nickel cobalt manganese oxide system, and the Type 2 battery cells may be of a lithium iron phosphate system. In the present application, when the Type 1 battery cells and the Type 2 battery cells in the battery module have different capacities, the battery charge balance rate of the Type 2 battery cells is set within the above range, the Type 1 battery cells is of a lithium nickel cobalt manganese oxide system and the Type 2 battery cells is of a lithium iron phosphate system, the actual capacity deviation between the battery cells with different battery designs in the middle and late cycle life of the battery module can be reduced by means of the advantages of slow capacity attenuation and long service life of the lithium iron phosphate system, thereby prolonging the service life of the battery module.

Those skilled in the art can understand that individual differences in battery cells will lead to unbalanced terminal voltages of different battery cells. In order to alleviate the deterioration in this unbalanced trend, the charging voltage of the battery module needs to be increased to activate and charge the battery module before the battery module is used, so as to balance the characteristics of the battery cells in the battery module, prolong the service life of the battery cells and improve energy utilization. For example, a bottom balance/top balance or active balance/passive balance charge/discharge strategy may be selected. The present application does not limit the balance strategy, and a battery module obtained after the balance strategy is performed on the battery module of the present application also falls within the scope of the battery module of the present application.

Figure 3:
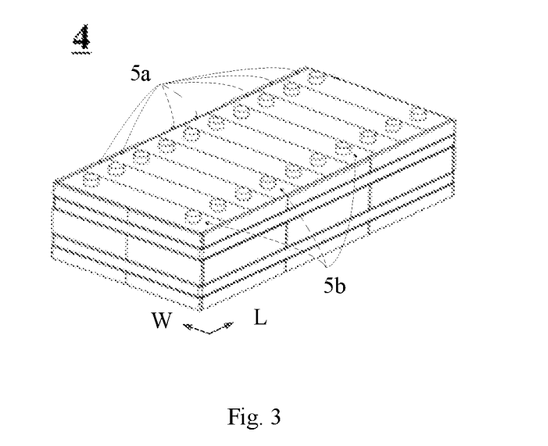
FIG. 3 is a schematic diagram of a battery module according to an embodiment of the present application.

FIG. 3 shows a battery module 4 as an example. Referring to FIG. 3, the battery module 4 may include a plurality of first-type battery cells 5a and a plurality of second-type battery cells 5b arranged in the length direction (for example, the L direction) of the battery module 4. Further, the battery cells may be fixed by fasteners.

In some examples, the battery module 4 may further include a housing with an accommodating space, and the plurality of battery cells 5 are accommodated in the accommodating space.

In the present application, the capacity of the battery cell, the capacity of the Type 1 battery cells, and the capacity of the Type 2 battery cells are well-known meanings in the art, and can be tested according to the aforementioned method.

In the present application, the mass of the active material per unit area of the electrode plate has a well-known meaning in the art, refers to the mass of the active material in an active material layer on a single side of a current collector per unit area, and can be measured by a method known in the art. For example, a single-side coated and cold-pressed electrode plate (for a double-side coated electrode plate, an active material layer on one side is wiped off first) is punched into a small wafer with an area of S1; then the active material layer on the surface of the electrode plate is soaked in a solvent and completely peeled off from the surface of the current collector; and the active material obtained above is repeatedly washed, dried, and sintered at 500° C. in an air atmosphere. Finally, the mass of the remaining material obtained by the sintering is weighed and denoted as M. Thus, the mass of the active material per unit area of the electrode plate may be calculated according to the formula: the mass of the active material per unit area of the electrode plate=M/S1.

In the present application, the charge capacity and charge capacity per gram of the positive electrode plate or the negative electrode plate are well-known meanings in the art, and can be tested by conventional methods. As an example, the charge capacity per gram may be tested by the following steps:

(1) Electrode plate sampling requirements are as follows:

A battery cell after fully discharged is disassembled to take out a positive electrode plate and a negative electrode plate, which are then appropriately washed with a DMC solution and dried for later use. The sampling position for the positive electrode plate is any position in the middle that is greater than 15 mm away from the edge. The sampling position for the negative electrode plate is: the negative electrode plate at the position opposite to the selected positive electrode plate is selected; and the sampling area of the positive electrode plate is the same as that of the negative electrode plate;

(2) The cut positive electrode plate and negative electrode plate and a lithium plate as counter electrodes respectively are assembled into coin half cells;

(3) Charge capacity of the negative electrode plate per unit area, and charge capacity per gram of the negative electrode plate:

The test voltage is from 0.05 to 2.0 V, the test temperature is 25° C., the charge/discharge rate is 0.1C, and no less than 10 parallel samples are taken. The charge capacities of the button half cells are tested respectively, an average value is obtained after the lowest and highest values are removed, and the charge capacity of the negative electrode plate in this area is obtained; the charge capacity of the negative electrode plate obtained in the above test is divided by the area of the negative electrode plate to obtain the charge capacity of the negative electrode plate per unit area;

The charge capacity per gram of the negative electrode plate=the charge capacity of the negative electrode plate per unit area/the mass of the active material per unit area of the negative electrode plate;

(4) Charge capacity of the positive electrode plate per unit area, and charge capacity per gram of the positive electrode plate:

Battery cells to be sampled are charged/discharged at 0.1C within the working voltage range specified in the GBT certification document and at room temperature of 25° C. No less than 10 parallel samples are taken. The charge capacities of the coin cells are tested respectively, an average value is obtained after the lowest and highest values are removed, and the charge capacity of the positive electrode plate in this area is obtained; the charge capacity of the positive electrode plate obtained in the above test is divided by the area of the positive electrode plate to obtain the charge capacity of the positive electrode plate per unit area;

The charge capacity per gram of the positive electrode plate=the charge capacity of the positive electrode plate per unit area/the mass of the active material per unit area of the positive electrode plate.

In the present application, the battery charge balance rate of the battery cell is a well-known meaning in the art, and may be tested by a conventional method. As an example, the following testing method may be used: the charge capacity of the negative electrode plate per unit area and the charge capacity of the positive electrode plate per unit area are respectively tested based on the above methods; and then the battery charge balance rate of the battery cell can be calculated based on the formula: the battery charge balance rate of the battery cell=the charge capacity of the negative electrode plate per unit area/the charge capacity of the positive electrode plate per unit area.

In a second aspect, the present application proposes a battery pack, including the above-mentioned battery module.

In some embodiments, the above-mentioned battery module may also be assembled into a battery pack, and the number of battery modules included in the battery pack may be adjusted according to the use and capacity of the battery pack.

Figure 4:
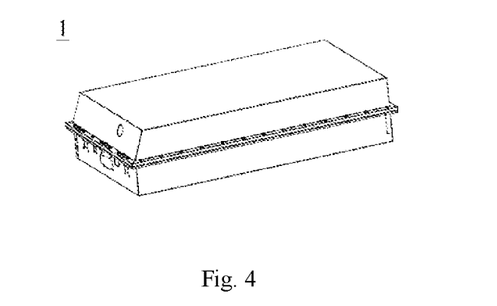
FIG. 4 is a schematic diagram of a battery pack according to an embodiment of the present application.
Figure 5:
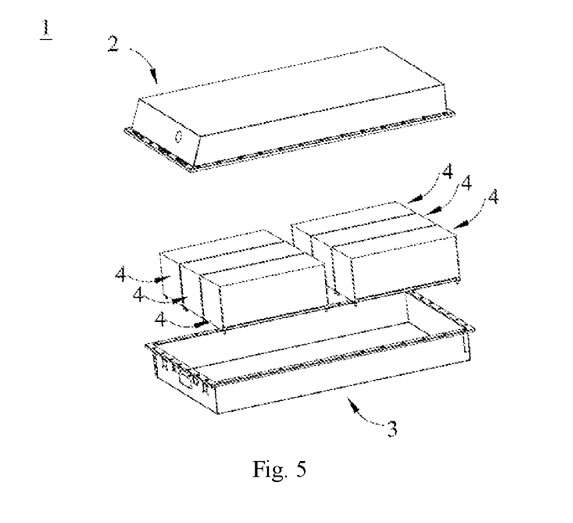
FIG. 5 is an exploded view of FIG. 4.

FIGS. 4 and 5 show a battery pack 1 as an example. Referring to FIGS. 4 and 5, the battery pack 1 may include a battery case and a plurality of battery modules 4 disposed in the battery case. The battery case includes an upper case body 2 and a lower case body 3. The upper case body 2 can cover the lower case body 3 to form a closed space for accommodating the battery modules 4. The plurality of battery modules 4 may be arranged in the battery case in any manner.

In a third aspect, the present application proposes an apparatus, including the above-mentioned battery module, wherein the battery module is a power source and/or an energy storage unit of the apparatus.

The apparatus may be, but is not limited to, a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf vehicle, an electric truck, etc.), an electric train, a ship, a satellite, an energy storage system, etc.

The apparatus may select the battery module or the battery pack according to its usage requirements.

Figure 6:
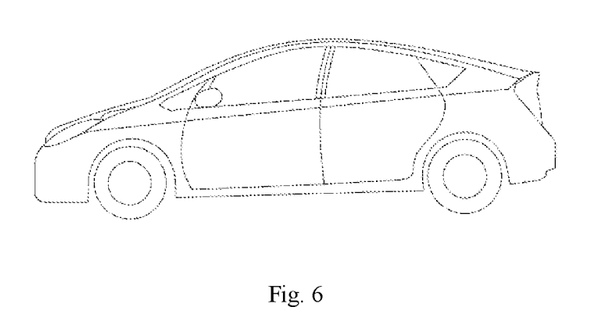
FIG. 6 is a schematic diagram of an apparatus using a battery pack as a power source according to an embodiment of the present application.

FIG. 6 shows an apparatus as an example. The apparatus is a pure electric vehicle, a hybrid electric vehicle, or a plug-in hybrid electric vehicle. In order to meet the requirements of the apparatus for high power and high energy density of the secondary battery, a battery pack or a battery module may be adopted.

In a fourth aspect, the present application proposes a method for manufacturing a battery module, including the following steps:

obtaining Type 1 battery cells and Type 2 battery cells; and connecting the Type 1 battery cells and the Type 2 battery cells in series to form the battery module, wherein the Type 1 battery cells and the Type 2 battery cells satisfy the following criteria:

$$1.01 \times C_1/C_2 \leq N_2 \leq 1.25, \text{ and } C_1 < C_2.$$

where $N_2$ is a battery charge balance rate of the Type 2 battery cells. $C_1$ and $C_2$ are respectively the capacities of the Type 1 battery cells and the Type 2 battery cells.

According to the method for manufacturing a battery module in the present application, the design in the battery cells and connections thereof enables the assembled battery module to realize balanced assembly of the battery cells, improves the safety and stability of the battery module, ensures relatively high energy output characteristics of the battery module, and effectively reduces the risk of lithium precipitation in the battery module composed of battery cells with different battery design parameters during charge and discharge processes.

Further, obtaining Type 1 battery cells and Type 2 battery cells includes: obtaining $n_1$ battery cells of the first type and $n_2$ battery cells of the second type, where $n_1$ and $n_2$ are natural numbers. It can be understood that the battery cells obtained by the manufacturing method of the present application may include a plurality of first-type battery cells or a plurality of second-type battery cells, and the number of battery cells is not constrained.

In a fifth aspect, the present application proposes an equipment for manufacturing a battery module, the equipment includes a processor, the processor is configured to control a clamp arm to obtain Type 1 battery cells and Type 2 battery cells; the processor is further configured to control assembly components to connect the Type 1 battery cells and the Type 2 battery cells in series to form the battery module;

The Type 1 battery cells and the Type 2 battery cells satisfy the following criteria:

$1.01 \times C_1/C_2 \leq N_2 \leq 1.25$, and $C_1 < C_2$, where $N_2$ is a battery charge balance rate of the Type 2 battery cells and $C_1$ and $C_2$ are respectively capacities of the Type 1 battery cells and the Type 2 battery cells.

Adopting the battery module manufactured by the equipment of the present application and implementing the balanced assembly of the battery cells and connection thereof ca ensure that the manufactured battery module has both good safety and stability and relatively high energy output characteristics, and reduces the risk of lithium precipitation of the battery module composed of battery cells with different battery design parameters.

Some of the additional aspects and advantages of the present application will be provided in the following description, and some will become apparent from the following description, or be learned by the practice of the present application.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Table 1 shows performance parameters of battery cells used in the examples and comparative examples of the present application. LFP-lithium iron phosphate, NCM-lithium nickel cobalt manganese oxide ($LiNi_{0.6}Co_{0.2}Mn_{0.2}O_2$), LNMO-lithium nickel manganese oxide ($LiNi_{0.5}Mn_{1.5}O_2$), LMO-lithium manganese oxide ($LiMn_2O_4$), NCA-lithium nickel cobalt aluminum oxide ($LiNi_{0.8}Co_{0.15}Al_{0.05}O_2$), lithium-rich manganese ($Li_{1.2}Mn_{0.44}Ni_{0.4}Co_{0.16}O_2$).

TABLE 1

Performance parameters of battery cells

| | Type of positive electrode active material | C (Ah) | WC (μg/mm²) | BC (mAh/g) | WA (μg/mm²) | BA (mAh/g) | Battery charge balance rate N | Energy density (Wh/Kg) |
|---|---|---|---|---|---|---|---|---|
| Battery cell 1 | LFP | 63.0 | 205.6 | 145.0 | 92.0 | 350.0 | 1.080 | 183.9 |
| Battery cell 2 | LFP | 63.0 | 205.9 | 145.0 | 88.2 | 350.0 | 1.034 | 185.6 |
| Battery cell 3 | LFP | 63.0 | 204.7 | 145.0 | 106.0 | 350.0 | 1.250 | 178.2 |
| Battery cell 4 | LFP | 62.9 | 204.7 | 145.0 | 101.8 | 350.0 | 1.200 | 179.8 |
| Battery cell 5 | LFP | 65.8 | 204.7 | 145.0 | 97.0 | 350.0 | 1.144 | 182.7 |
| Battery cell 6 | LFP | 65.9 | 205.9 | 145.0 | 84.7 | 350.0 | 0.993 | 188.1 |
| Battery cell 7 | LFP | 72.0 | 205.6 | 145.0 | 92.0 | 350.0 | 1.080 | 187.0 |
| Battery cell 8 | NCM | 59.9 | 175.4 | 188.0 | 101.8 | 350.0 | 1.080 | 204.2 |
| Battery cell 9 | NCM | 60.1 | 175.5 | 188.0 | 113.2 | 350.0 | 1.200 | 199.3 |
| Battery cell 10 | NCM | 60.0 | 175.5 | 188.0 | 105.9 | 350.0 | 1.123 | 202.4 |
| Battery cell 11 | NCM | 60.2 | 175.5 | 188.0 | 117.9 | 350.0 | 1.250 | 197.3 |
| Battery cell 12 | Li-rich manganese | 62.7 | 163.8 | 200.0 | 107.1 | 350.0 | 1.144 | 207.1 |
| Battery cell 13 | LNMO | 62.4 | 207.2 | 125.0 | 84.6 | 350.0 | 1.144 | 167.7 |
| Battery cell 14 | LMO | 62.4 | 207.2 | 125.0 | 84.6 | 350.0 | 1.144 | 167.7 |
| Battery cell 15 | NCA | 62.6 | 206.5 | 150.0 | 101.3 | 350.0 | 1.144 | 184.9 |
| Battery cell 16 | NCM | 60.0 | 174.9 | 188.0 | 117.5 | 350.0 | 1.250 | 197.2 |
| Battery cell 17 | LFP | 66.0 | 198.9 | 145.0 | 66.1 | 350.0 | 0.802 | 194.5 |
| Battery cell 18 | LFP | 73.4 | 206.5 | 145.0 | 92.4 | 350.0 | 1.080 | 187.5 |
| Battery cell 19 | LFP | 63.0 | 202.2 | 145.0 | 109.1 | 350.0 | 1.303 | 176.2 |

TABLE 1-continued

Performance parameters of battery cells

|  | Type of positive electrode active material | C (Ah) | WC (μg/mm²) | BC (mAh/g) | WA (μg/mm²) | BA (mAh/g) | Battery charge balance rate N | Energy density (Wh/Kg) |
|---|---|---|---|---|---|---|---|---|
| Battery cell 20 | NCM | 60.1 | 174.9 | 188.0 | 120.3 | 350.0 | 1.281 | 196.0 |
| Battery cell 21 | NCM | 60.0 | 176.3 | 188.0 | 90.0 | 350.0 | 0.951 | 210.1 |
| Battery cell 22 | LFP | 63.0 | 203.6 | 145.0 | 86.9 | 350.0 | 1.030 | 185.5 |
| Battery cell 23 | LFP | 60.0 | 203.1 | 145.0 | 94.5 | 350.0 | 1.123 | 181.0 |
| Battery cell 24 | LFP | 63.0 | 204.1 | 145.0 | 80.4 | 350.0 | 0.951 | 188.3 |
| Battery cell 25 | LFP | 63.0 | 203.1 | 145.0 | 94.5 | 350.0 | 1.123 | 182.2 |
| Battery cell 26 | LFP | 66.0 | 203.0 | 145.0 | 94.5 | 350.0 | 1.123 | 183.3 |
| Battery cell 27 | LFP | 69.0 | 202.9 | 145.0 | 94.4 | 350.0 | 1.123 | 184.2 |
| Battery cell 28 | LFP | 72.0 | 202.8 | 145.0 | 94.4 | 350.0 | 1.123 | 185.1 |
| Battery cell 29 | LFP | 75.0 | 202.6 | 145.0 | 94.3 | 350.0 | 1.123 | 186.0 |
| Battery cell 30 | LFP | 63.0 | 204.6 | 145.0 | 72.1 | 350.0 | 0.850 | 192.1 |
| Battery cell 31 | NCM | 60.4 | 175.1 | 188.0 | 105.6 | 350.0 | 1.123 | 202.5 |
| Battery cell 32 | LFP | 72.0 | 205.8 | 145.0 | 76.8 | 350.0 | 0.901 | 193.6 |

The performance parameters of the above battery cells can be tested by the following methods:

1. Mass of Active Material Per Unit Area of a Positive Electrode Plate

A single-side coated and cold-pressed positive electrode plate (for a double-side coated positive electrode plate, an active material layer on one side was wiped off first) was punched into a small wafer with an area of S1; then the positive electrode plate was placed in an NMP solution to completely peel off the positive electrode active material layer; the negative electrode active material obtained after the peeling was washed and dried; and the dried material was sintered at about 500° C. in an air atmosphere for 4 to 5 h. Finally, the mass of the remaining material obtained by the sintering was weighed and denoted as $M_c$. Thus, the mass of the active material per unit area of the positive electrode plate was calculated according to the following formula:

The mass of the active material per unit area of the positive electrode plate=$M_c/S1$.

2. Mass of Active Material Per Unit Area of a Negative Electrode Plate

A single-side coated and cold-pressed negative electrode plate (for a double-side coated negative electrode plate, an active material layer on one side was wiped off first) was punched into a small wafer with an area of S1; then the negative electrode plate was placed in deionized water to completely peel off the negative electrode active material layer, the positive electrode active material obtained after the peeling was washed and dried; and the dried material was sintered at about 500° C. in an air atmosphere for 4 to 5 h. Finally, the mass of the remaining material obtained by the sintering was weighed and denoted as $M_A$. Thus, the mass of the active material per unit area of the electrode plate was calculated according to the formula: the mass of the active material per unit area of the electrode plate=$M_A/S1$.

2. Charge Capacity and Charge Capacity Per Gram of the Positive Electrode Plate or the Negative Electrode Plate (1) Electrode plate sampling requirements are as follows:

The battery cell after fully discharged was disassembled to take out the positive electrode plate and the negative electrode plate, which were then appropriately washed with a DMC solution and dried for later use. The sampling position of the positive electrode plate was any position at the middle that is greater than 15 mm away from the edge. The negative electrode plate for sampling was the negative electrode plate at the position opposite to the selected positive electrode plate; and the sampling area of the positive electrode plate was the same as that of the negative electrode plate;

(2) The cut positive electrode plate and negative electrode plate and a lithium plate as counter electrodes respectively were assembled into coin half cells;

(3) Charge capacity of the negative electrode plate per unit area, and charge capacity per gram of the negative electrode plate:

The test voltage was from 0.05 to 2.0 V, the test temperature was 25° C., the charge/discharge rate was 0.1C, and no less than 10 parallel samples were taken. The charge capacities of the button half cells were tested respectively, an average value was determined after the lowest and highest values are removed, and the charge capacity of the negative electrode plate in this area was obtained; the charge capacity of the negative electrode plate obtained in the above test divided the area of the negative electrode plate, the charge capacity of the negative electrode plate per unit area was obtained;

The charge capacity per gram of the negative electrode plate=the charge capacity of the negative electrode plate per unit area/the mass of the active material per unit area of the negative electrode plate;

(4) Charge capacity of the positive electrode plate per unit area, and charge capacity per gram of the positive electrode plate:

Sampled battery cells were charged/discharged at 0.1C within the working voltage range specified in the GBT certification document and at room temperature of 25° C. and, no less than 10 parallel samples were taken. The charge capacities of the coin cells were tested respectively, an average value was determined after the lowest and highest values were removed, and the charge capacity of the positive electrode plate in this area was obtained; the charge capacity of the positive electrode plate obtained in the above test was divided by the area of the positive electrode plate to obtain the charge capacity of the positive electrode plate per unit area;

The charge capacity per gram of the positive electrode plate=the charge capacity of the positive electrode plate per unit area/the mass of the active material per unit area of the positive electrode plate.

3. Method for Testing a Battery Charge Balance Rate of a Battery Cell

The charge capacity of the negative electrode plate per unit area and the charge capacity of the positive electrode plate per unit area were respectively tested according to the above methods; and then the battery charge balance rate of the battery cell was calculated according to a formula: the battery charge balance rate of the battery cell=the charge capacity of the negative electrode plate per unit area/the charge capacity of the positive electrode plate per unit area.

4. Mass Energy Density of the Battery Cell

The mass energy density of the battery cell was a maximum energy of the battery cell within the working voltage range specified in the GBT certification document for sampled battery cells divided by the mass of the battery cell.

In the following examples and comparative examples, the battery module was tested as follows:

1. Method for Testing Lithium Precipitation of a Battery Module

The test process was as follows:
1) The battery module was charged at a constant current rate of 0.33C to an upper cut-off voltage specified in the GBT certification document, and then charged at a constant voltage until the current was less than 0.05C;
2) Allow the battery module to stand for 10 min;
3) The battery module was discharged at the constant current rate of 0.33C to a lower cut-off voltage specified in the GBT certification document;
4) Steps 1) to 3) was regarded as a charge and discharge cycle and the battery module was charged and discharged for 20 cycles;
5) The battery module was charged at the constant current rate of 0.33C to the upper cut-off voltage, and then charged at the constant voltage until the current was less than 0.05C; the battery cells in the battery module were disassembled, and the negative electrode plate was taken out to observe whether lithium was precipitated on the surface of the electrode plate. In the test results, the lithium precipitation test data was expressed by a lithium precipitation test pass rate. The lithium precipitation test pass rate=the number of battery cells without lithium precipitation at the negative electrode plate/the total number of battery cells for the lithium precipitation test.

2. Method for Testing a Mass Capacity Density of the Battery Module

The mass capacity density of the battery module was the sum of capacities of all battery cells in the battery module divided by the mass of the battery module, excluding other components of the battery module, where the other components of the battery module include but not limited to a wiring harness, an end plate and/or a side plate, and a top cover plate.

3. Method for Testing a Volume Capacity Density of the Battery Module

The volume capacity density of the battery module was the sum of capacities of all battery cells in the battery module divided by the total volume (length×width×height) of the battery module. The total volume of the battery module includes a volume of all battery cells, and other components of the battery module (including but not limited to a wiring harness, an end plate and/or a side plate, and a top cover plate).

Example 1

Example 1 provided a battery module. The battery module included six battery cells 16 and three battery cells 22, and the six battery cells 16 and the three battery cells were connected in series. From the data in Table 1, it can be seen that the capacity of the battery cells 16 was smaller than that of the battery cells 22. That is, the battery cells 16 were Type 1 battery cells, the battery cells 22 were Type 2 battery cells, and the battery charge balance rate $N_2$ of the battery cells 22 satisfied: $1.01 \times C_1/C_2 \leq N_2 \leq 1.25$.

Example 1 further proposed a method for manufacturing the above-mentioned battery module, including the following steps:

Obtaining six first-type battery cells (battery cells 16) and three second-type battery cells (battery cells 22); and Connecting the battery cells 16 and the battery cells 22 were connected in series to form the battery module.

Example 1 further proposed an equipment for manufacturing the above-mentioned battery module. The equipment for manufacturing the battery module included a processor, which was configured to control a clamp arm to obtain Type 1 battery cells (battery cells 16) and Type 2 battery cells (battery cells 22); and the processor was further configured to control assembly components to connect the battery cells 16 and the battery cells 22 in series to form the battery module.

Example 2

Example 2 provided a battery module. The battery module included six battery cells 8 and three battery cells 32, the battery cells 8 were Type 1 battery cells, and the battery cells 32 were Type 2 battery cells, wherein one battery cell 8 was connected with two battery cells 32 in series.

Example 3

Example 3 provided a battery module. The battery module included six battery cells 16 and three battery cells 1, the battery cells 16 were Type 1 battery cells, and the battery cells 1 were Type 2 battery cells, wherein one battery cell 16 was connected with two battery cells 1 in series.

Example 4

Example 4 provided a battery module. The battery module included six battery cells 10 and three battery cells 2, the battery cells 10 were Type 1 battery cells, and the battery cells 2 were Type 2 battery cells, wherein one battery cell 10 was connected with two battery cells 2 in series.

Example 5

Example 5 provided a battery module. The battery module included six battery cells 10 and three battery cells 1, the battery cells 10 were Type 1 battery cells, and the battery cells 1 were Type 2 battery cells, wherein one battery cell 10 was connected with two battery cells 1 in series.

Example 6

Example 6 provided a battery module. The battery module included six battery cells 10 and three battery cells 4, the battery cells 10 were Type 1 battery cells, and the battery cells 4 were Type 2 battery cells, wherein one battery cell 10 was connected with two battery cells 4 in series.

Example 7

Example 7 provided a battery module. The battery module included six battery cells 8 and three battery cells 3, the battery cells 8 were Type 1 battery cells, and the battery cells 3 were Type 2 battery cells, wherein one battery cell 8 was connected with two battery cells 3 in series.

Comparative Example 1

Comparative Example 1 provided a battery module. The battery module included six battery cells 10 and three battery cells 30, the battery cells 10 were Type 1 battery cells, and the battery cells 30 were Type 2 battery cells, wherein one battery cell 10 was connected with two battery cells 30 in series.

Comparative Example 2

Comparative Example 2 provided a battery module. The battery module included six battery cells 9 and three battery cells 19, the battery cells 9 were Type 1 battery cells, and the battery cells 19 were Type 2 battery cells, wherein one battery cell 9 was connected with two battery cells 19 in series.

Comparative Example 3

Comparative Example 3 provided a battery module. The battery module included six battery cells 10 and three battery cells 19, the battery cells 10 were Type 1 battery cells, and the battery cells 19 were Type 2 battery cells, wherein one battery cell 10 was connected with two battery cells 19 in series.

Comparative Example 4

Comparative Example 4 provided a battery module. The battery module included six battery cells 10 and three battery cells 23, the battery cells 10 were Type 1 battery cells, and the battery cells 23 were Type 2 battery cells, wherein one battery cell 10 was connected with two battery cells 23 in series.

The test data of the battery modules in Examples (Ex.) 1-7 and Comparative Examples (CEx.) 1-4 were shown in Table 2.

TABLE 2

Test data of the battery modules in Examples 1-7 and Comparative Examples 1-4

| Number | $C_1$ | $C_2$ | $C_2/C_1$ | $N_2$ | $1.01$ $C_1/C_2$ | $n_2 \times C_2 /$ $(n_1 \times C_1 +$ $n_2 \times C_2)$ | Lithium precipitation test pass rate | Mass capacity density of battery module (Ah/kg) | Volume capacity density of battery module (Ah/L) |
|---|---|---|---|---|---|---|---|---|---|
| Ex. 1 | 60.0 | 63.0 | 1.05 | 1.03 | 0.96 | 0.34 | 10/10 | 67.44 | 141.0 |
| Ex. 2 | 59.9 | 72.0 | 1.20 | 0.90 | 0.84 | 0.38 | 10/10 | 66.50 | 136.5 |
| Ex. 3 | 60.0 | 63.0 | 1.05 | 1.08 | 0.96 | 0.34 | 10/10 | 67.42 | 139.5 |
| Ex. 4 | 60.0 | 63.0 | 1.05 | 1.08 | 0.96 | 0.34 | 10/10 | 68.52 | 141.2 |
| Ex. 5 | 60.0 | 63.0 | 1.05 | 1.03 | 0.96 | 0.34 | 10/10 | 68.76 | 141.6 |
| Ex. 6 | 60.0 | 62.9 | 1.05 | 1.20 | 0.96 | 0.34 | 10/10 | 67.88 | 138.0 |
| Ex. 7 | 59.9 | 63.0 | 1.05 | 1.25 | 0.96 | 0.34 | 10/10 | 67.97 | 138.5 |
| CEx. 1 | 60.0 | 63.0 | 1.05 | 0.85 | 0.96 | 0.34 | 6/10 | 68.8 | 143.1 |
| CEx. 2 | 59.9 | 63.0 | 1.20 | 1.30 | 0.96 | 0.34 | 10/10 | 62.5 | 128.5 |
| CEx. 3 | 60.0 | 63.0 | 1.05 | 1.30 | 0.96 | 0.34 | 10/10 | 63.3 | 129.6 |
| CEx. 4 | 60.0 | 63.0 | 1.05 | 0.95 | 0.96 | 0.34 | 6/10 | 67.2 | 135.0 |

Note:
the mass of mechanical parts is not included in the calculation of mass capacity density.

Comparing the data of Examples 1-7 and Comparative Examples 1-4, it can be seen that when $N_2$ was not within the range of $1.01 \times C_1/C_2 \leq N_2 \leq 1.25$, the mass capacity density of the battery module would deteriorate or lithium precipitation would occur. Specifically, in Comparative Example 1, the lithium precipitation pass rate was only 6/10, which means a relatively high risk in safety performance, although the battery module had a higher mass capacity density. In Comparative Example 4, while the battery module had a risk of lithium precipitation, the mass capacity density of the battery module also deteriorated seriously. In Comparative Examples 2 and 3, although the battery module had a relatively high lithium precipitation pass rate, the mass capacity density of the battery module deteriorated seriously, which therefore affected the energy output performance of the battery module.

Example 8

Example 8 provided a battery module. The battery module included six battery cells 10 and three battery cells 26, the battery cells 10 were Type 1 battery cells, and the battery cells 26 were Type 2 battery cells, wherein one battery cell 10 was connected with two battery cells 26 in series.

Example 9

Example 9 provided a battery module. The battery module included six battery cells 10 and three battery cells 27, the battery cells 10 were Type 1 battery cells, and the battery cells 27 were Type 2 battery cells, wherein one battery cell 10 was connected with two battery cells 27 in series.

Example 10

Example 10 provided a battery module. The battery module included six battery cells 10 and three battery cells 28, the battery cells 10 were Type 1 battery cells, and the battery cells 28 were Type 2 battery cells, wherein one battery cell 10 was connected with two battery cells 28 in series.

Example 11

Example 11 provided a battery module. The battery module included six battery cells 10 and three battery cells 29, the battery cells 10 were Type 1 battery cells, and the battery cells 29 were Type 2 battery cells, wherein one battery cell 10 was connected with two battery cells 29 in series.

The test data of the battery modules in Examples 8-11 (Ex. 8-11) were shown in Table 3.

TABLE 3

Test data of the battery modules in Examples 8-11

| No. | $C_1$ | $C_2$ | $C_2/C_1$ | $N_2$ | $1.01$ $C_1/C_2$ | $n_2 \times C_2/$ $(n_1 \times C_1 +$ $n_2 \times C_2)$ | Lithium precipitation test pass rate | Mass capacity density of battery module (Ah/kg) | Volume capacity density of battery module (Ah/L) |
|---|---|---|---|---|---|---|---|---|---|
| Ex. 1 | 60.0 | 63.0 | 1.05 | 1.03 | 0.96 | 0.34 | 10/10 | 67.44 | 141.0 |
| Ex. 8 | 60.0 | 66.0 | 1.10 | 1.123 | 0.92 | 0.35 | 10/10 | 67.06 | 137 |
| Ex. 9 | 60.0 | 69.0 | 1.15 | 1.123 | 0.88 | 0.37 | 10/10 | 65.93 | 134 |
| Ex. 10 | 60.0 | 72.0 | 1.20 | 1.123 | 0.84 | 0.38 | 10/10 | 64.82 | 132 |
| Ex. 11 | 60.0 | 75.0 | 1.25 | 1.123 | 0.80 | 0.38 | 10/10 | 63.76 | 130 |

It can be seen from Examples 8-11 that when the battery charge balance rate $N_2$ of the Type 2 battery cells satisfied the range of $1.01 \times C_1/C_2 \leq N_2 \leq 1.25$, and the capacities of the Type 1 battery cells and the Type 2 battery cells further satisfied: $C_2/C_1 \leq 1.2$, and especially when the value of $C_2/C_1$ gradually decreased, for example, when $C_2/C_1=1.1$, the battery module was not prone to lithium precipitation, and the volume capacity density and energy density of the battery module were increasing.

Example 12

Example 12 provided a battery module. The battery module included one battery cell 16 and one hundred battery cells 1, the battery cell 16 was Type 1 battery cell, and the battery cells 1 were Type 2 battery cells, wherein the battery cell 16 was connected with eighty-four battery cells 1 in series.

Example 13

Example 13 provided a battery module. The battery module included one battery cell 16 and ten battery cells 1, the battery cell 16 was Type 1 battery cell, and the battery cells 1 were Type 2 battery cells, wherein the battery cell 16 was connected with two battery cells 1 in series.

Example 14

Example 14 provided a battery module. The battery module included one battery cell 16 and nine battery cells 1, the battery cell 16 was Type 1 battery cell, and the battery cells 1 were Type 2 battery cells, wherein the battery cell 16 was connected with two battery cells 1 in series.

Example 15

Example 15 provided a battery module. The battery module included five battery cells 16 and five battery cells 1, the battery cells 16 were Type 1 battery cells, and the battery cells 1 were Type 2 battery cells, wherein two battery cells 16 were connected with two battery cells 1 in series.

Example 16

Example 16 provided a battery module. The battery module included five battery cells 16 and one battery cell 1, the battery cells 16 were Type 1 battery cells, and the battery cell 1 was Type 2 battery cell, wherein one battery cell 16 was connected with the battery cell 1 in series.

Example 17

Example 17 provided a battery module. The battery module included ten battery cells 16 and one battery cell 1, the battery cells 16 were Type 1 battery cells, and the battery cell 1 was Type 2 battery cell, wherein one battery cell 16 was connected with the battery cell 1 in series.

Example 18

Example 18 provided a battery module. The battery module included twenty battery cells 16 and one battery cell 1, the battery cells 16 were Type 1 battery cells, and the battery cell 1 was Type 2 battery cell, wherein three battery cells 16 were connected with the battery cell 1 in series.

Example 19

Example 19 provided a battery module. The battery module included fifty battery cells 16 and one battery cell 1, the battery cells 16 were Type 1 battery cells, and the battery cell 1 was Type 2 battery cell, wherein twelve battery cells 16 were connected with the battery cell 1 in series.

Example 20

Example 20 provided a battery module. The battery module included eighty battery cells 16 and one battery cell 1, the battery cells 16 were Type 1 battery cells, and the battery cell 1 was Type 2 battery cell, wherein sixty-three battery cells 16 were connected with the battery cell 1 in series.

Example 21

Example 21 provided a battery module. The battery module included one hundred battery cells 16 and one battery cell 1, the battery cells 16 were Type 1 battery cells, and the battery cell 1 was Type 2 battery cell, wherein thirty-seven battery cells 16 were connected with the battery cell 1 in series.

The test data of the battery modules in Examples 12-21 (Ex. 12-21) were shown in Table 4.

Example 22

Example 22 provided a battery pack. The battery pack of Example 22 was assembled by connecting the battery modules of Examples 1, 4, 6 and 18 in series.

Example 23

Example 23 provided a battery pack. The battery pack of Example 23 was formed by connecting the battery modules of Examples 5, 8, 13, 15 and 22 in parallel.

Example 24

Example 24 provided a battery pack. The battery pack of Example 24 was formed by connecting the battery packs of Examples 1 and 3 in series and then connecting the same with the battery module of Example 7 in parallel.

Example 25

Example 25 provided an electric vehicle. The electric vehicle of Example 25 was provided with the battery module of Example 13, and the battery module of Example 13 was a power source and/or an energy storage unit of said apparatus.

TABLE 4

Test data of the battery modules in Examples 12-21

| No. | $C_1$ | $C_2$ | $C_2/C_1$ | $N_2$ | $1.01$ $C_1/C_2$ | $n_2 \times C_2/$ $(n_1 \times C_1 + n_2 \times C_2)$ | Lithium precipitation test pass rate | Mass capacity density of battery module (Ah/kg) | Volume capacity density of battery module (Ah/L) |
|---|---|---|---|---|---|---|---|---|---|
| Ex. 12 | 60.0 | 63.0 | 1.05 | 1.08 | 0.96 | 0.991 | 10/10 | 61.7 | 123.9 |
| Ex. 13 | 60.0 | 63.0 | 1.05 | 1.08 | 0.96 | 0.913 | 10/10 | 62.3 | 125.6 |
| Ex. 14 | 60.0 | 63.0 | 1.05 | 1.08 | 0.96 | 0.904 | 10/10 | 62.4 | 125.8 |
| Ex. 15 | 60.0 | 63.0 | 1.05 | 1.08 | 0.96 | 0.512 | 10/10 | 65.7 | 135.3 |
| Ex. 16 | 60.0 | 63.0 | 1.05 | 1.08 | 0.96 | 0.174 | 10/10 | 68.8 | 142.4 |
| Ex. 17 | 60.0 | 63.0 | 1.05 | 1.08 | 0.96 | 0.095 | 10/10 | 69.5 | 144.6 |
| Ex. 18 | 60.0 | 63.0 | 1.05 | 1.08 | 0.96 | 0.050 | 10/10 | 70.0 | 145.9 |
| Ex. 19 | 60.0 | 63.0 | 1.05 | 1.08 | 0.96 | 0.021 | 10/10 | 70.2 | 146.8 |
| Ex. 20 | 60.0 | 63.0 | 1.05 | 1.08 | 0.96 | 0.013 | 10/10 | 70.3 | 147.0 |
| Ex. 21 | 60.0 | 63.0 | 1.05 | 1.08 | 0.96 | 0.010 | 10/10 | 70.3 | 147.1 |

Comparing Example 12 to Example 21, it can be seen that when the battery charge balance rate $N_2$ of the Type 2 battery cells satisfied the range of $1.01 \times C_1/C_2 \leq N_2 \leq 1.25$, and $0.01 \leq n_1/n_2 \leq 100$, lithium precipitation would not occur in the negative electrodes of the battery cells forming the battery module. However, when the battery charge balance rate $N_2$ of the Type 2 battery cells satisfied the range of $1.01 \times C_1/C_2 \leq N_2 \leq 1.25$, $0.1 \leq n_1/n_2 \leq 10$, and especially $10\% \leq n_2 \times C_2/(n_1 \times C_1 + n_2 \times C_2) \leq 90\%$, the increase in the number of the Type 1 battery cells would correspondingly increase the energy density and volume capacity density of the battery module. During use, the number of battery cells in the battery module may be selected according to the requirements to overall performance, such as energy density, volume and weight of the battery module.

Below are some exemplary embodiments of the present application.

Embodiment 1

A battery module, comprising Type 1 battery cells and Type 2 battery cells connected in series;

wherein the Type 1 battery cells and the Type 2 battery cells satisfy the following criteria:

$$1.01 \times C_1/C_2 \leq N_2 \leq 1.25, \text{ and } C_1 < C_2,$$

where $N_2$ is a battery charge balance rate of the Type 2 battery cells; and $C_1$ and $C_2$ are respectively capacities of the Type 1 battery cells and the Type 2 battery cells.

Embodiment 2

The battery module according to Embodiment 1, wherein $1.01 \times C_1/C_2 \leq N_2 \leq 1.20$; and optionally, $1.01 \times C_1/C_2 \leq N_2 \leq 1.18$.

Embodiment 3

The battery module according to Embodiment 1 or 2, wherein Type 1a battery charge balance rate of the Type 1 battery cells, denoted as $N_1$, satisfies $0.9 \leq N_1 \leq 1.3$; optionally, $0.95 \leq N_1 \leq 1.2$; and/or, a battery charge balance rate of the Type 2 battery cells, denoted as $N_2$, satisfies $0.8 \leq N_2 \leq 1.25$; optionally, $0.9 \leq N_2 \leq 1.18$.

Embodiment 4

The battery module according to any one of Embodiments 1-3, wherein $C_2/C_1 \leq 1.2$; optionally, $C_2/C_1 \leq 1.1$; and further optionally, $C_2/C_1 \leq 1.05$.

Embodiment 5

The battery module according to any one of Embodiments 1-4, wherein the Type 1 battery cells satisfies at least one of the following conditions:
(1) a mass $WA_1$ of an active material per unit area of a negative electrode plate of the Type 1 battery cells is 60 $\mu g/mm^2 \leq WA_1 \leq 170$ $\mu g/mm^2$; optionally, 80 $\mu g/mm^2 \leq WA_1 \leq 130$ $\mu g/mm^2$; and further optionally, 90 $\mu g/mm^2 \leq WA_1 \leq 120$ $\mu g/mm^2$;
(2) a charge capacity per gram $BA_1$ of the negative electrode plate of the Type 1 battery cells is 320 mAh/g $\leq BA_1 \leq 380$ mAh/g;
(3) a mass $WC_1$ of an active material per unit area of a positive electrode plate of the Type 1 battery cells is 120 $\mu g/mm^2 \leq WC_1 \leq 280$ $\mu g/mm^2$; optionally, 160 $\mu g/mm^2 \leq WC_1 \leq 210$ $\mu g/mm^2$; and further optionally, 163 $\mu g/mm^2 \leq WC_1 \leq 208$ $\mu g/mm^2$;
(4) a charge capacity per gram $BC_1$ of the positive electrode plate of the Type 1 battery cells is 100 mAh/g $\leq BC_1 \leq 230$ mAh/g; optionally, 125 mAh/g $\leq BC_1 \leq 200$ mAh/g; and further optionally, 150 mAh/g $\leq BC_1 \leq 190$ mAh/g.

Embodiment 6

The battery module according to any one of Embodiments 1-4, wherein the Type 2 battery cells satisfies at least one of the following conditions:
(1) a mass $WA_2$ of an active material per unit area of a negative electrode plate of the Type 2 battery cells is 60 $\mu g/mm^2 \leq WA_2 \leq 170$ $\mu g/mm^2$; optionally, 65 $\mu g/mm^2 \leq WA_2 \leq 120$ $\mu g/mm^2$; and further optionally, 85 $\mu g/mm^2 \leq WA_2 \leq 110$ $\mu g/mm^2$;
(2) a charge capacity per gram $BA_2$ of the negative electrode plate of the Type 2 battery cells is 320 mAh/g $\leq BA_2 \leq 380$ mAh/g;
(3) a mass $WC_2$ of an active material per unit area of a positive electrode plate of the Type 2 battery cells is 120 $\mu g/mm^2 \leq WC_2 \leq 280$ $\mu g/mm^2$; optionally, 190 $\mu g/mm^2 \leq WC_2 \leq 210$ $\mu g/mm^2$; and further optionally, 195 $\mu g/mm^2 \leq WC_2 \leq 208$ $\mu g/mm^2$;
(4) a charge capacity per gram $BC_2$ of the positive electrode plate of the Type 2 battery cells is 100 mAh/g $\leq BA_2 \leq 230$ mAh/g.

Embodiment 7

The battery module according to any one of Embodiments 1-6, wherein, in the battery module, the number of the Type 1 battery cells is $n_1$, the number of the Type 2 battery cells is $n_2$, and the $n_1$ and the $n_2$ are natural numbers and satisfy at least one of the following conditions:

$$0.01 \leq n_1/n_2 \leq 100; \text{ and optionally, } 0.1 \leq n_1/n_2 \leq 10; \quad (1)$$

$$10\% \leq n_2 \times C_2/(n_1 \times C1 + n_2 \times C_2) \leq 60\%. \quad (2)$$

Embodiment 8

The battery module according to any one of Embodiments 1-7, wherein the Type 1 battery cells and the Type 2 battery cells are battery cells of different chemical systems, and the chemical systems are classified by components of positive electrode active materials of the battery cells;

optionally, the chemical systems of the Type 1 battery cells and the Type 2 battery cells are independently selected from one of a lithium nickel cobalt manganese system, a lithium iron phosphate system, a lithium iron vanadium phosphate system, a lithium vanadium phosphate system, a lithium cobaltate system, a lithium nickelate system, a lithium-rich manganese system, a lithium nickel cobalt aluminum system, and a lithium manganate system;

further optionally, the chemical system of the Type 1 battery cells is one of a lithium nickel cobalt manganese oxide system, a lithium cobaltate system, a lithium nickelate system, a lithium-rich manganese system, a lithium nickel cobalt aluminum system, and a lithium manganate system; and/or, the chemical system of the Type 2 battery cells is one of a lithium iron phosphate system, a lithium iron vanadium phosphate system, or a lithium vanadium phosphate system.

Embodiment 9

A battery pack, comprising the battery module according to any one of Embodiments 1-8.

Embodiment 10

An apparatus, comprising the battery module according to any one of claims 1-8 or the battery pack according to Embodiment 9, wherein the battery module or the battery pack is used to provide power supply for the apparatus and/or used as an energy storage unit of the apparatus.

Embodiment 11

A method for manufacturing a battery module, comprising the following steps:
obtaining Type 1 battery cells and Type 2 battery cells; and
connecting the Type 1 battery cells and the Type 2 battery cells in series to form the battery module,
wherein the Type 1 battery cells and the Type 2 battery cells satisfy the following criteria:

$$1.01 \times C_1/C_2 \leq N_2 \leq 1.25, \text{ and } C_1 < C_2,$$

where $N_2$ is a battery charge balance rate of the Type 2 battery cells; and $C_1$ and $C_2$ are respectively capacities of the Type 1 battery cells and the Type 2 battery cells.

Embodiment 12

The manufacturing method according to Embodiment 11, wherein
obtaining the Type 1 battery cells and the Type 2 battery cells comprises: obtaining $n_1$ battery cells of the first type and $n_2$ battery cells of the second type, wherein the $n_1$ and the $n_2$ are natural numbers; optionally, $0.01 \leq n_1/n_2 \leq 100$; optionally, $0.1 \leq n_1/n_2 \leq 10$; and further optionally, $10\% \leq n_2 \times C_2/(n_1 \times C1 + n_2 \times C_2) \leq 60\%$.

Embodiment 13

An equipment for manufacturing a battery module, comprising
the equipment comprising a processor,
the processor configured to control a clamp arm to obtain Type 1 battery cells and Type 2 battery cells;
the processor further configured to control assembly components to connect the Type 1 battery cells and the Type 2 battery cells in series to form the battery module,
wherein the Type 1 battery cells and the Type 2 battery cells satisfy the following criteria:

$$1.01 \times C_1/C_2 \leq N_2 \leq 1.25, \text{ and } C_1 < C_2,$$

where $N_2$ is a battery charge balance rate of the Type 2 battery cells; and $C_1$ and $C_2$ are respectively capacities of the Type 1 battery cells and the Type 2 battery cells.

In the description of this specification, the terms "one embodiment", "some embodiments", "an example", "a specific embodiment", or "some examples" and the like mean that specific features, structures, materials or characteristics described in conjunction with the embodiments or examples are included in at least one embodiment or example of the present application. In this specification, the schematic descriptions of the above terms do not necessarily refer to the same embodiment or example. Moreover, the specific features, structures, materials or characteristics described can be combined appropriately in one or more embodiments or examples. In addition, different embodiments or examples described in this specification and features of different embodiments or examples can be combined by those skilled in the art without conflicting with each other.

Although the embodiments of the present application are shown and described above, it can be understood that the above-mentioned embodiments are exemplary and should not be construed as limiting the present application. Changes, modifications, substitutions and variations may be made to the above embodiments by those of ordinary skill in the art within the scope of the present application.

What is claimed is:

1. A battery module (4), comprising Type 1 battery cells and Type 2 battery cells connected in series;
   wherein the Type 1 battery cells and the Type 2 battery cells satisfy the following criteria:

$$1.01 \times A_1/A_2 \leq X_2 \leq 1.25, \text{ and } A_1 < A_2,$$

where $X_2$ is a battery charge balance rate of the Type 2 battery cells; and $A_1$ and $A_2$ are respectively capacities of the Type 1 battery cells and the Type 2 battery cells,
   wherein the Type 1 battery cells and the Type 2 battery cells are physically present at the same time and work at the same time during charging and discharging, and the Type 1 battery cells and the Type 2 battery cells are battery cells of different chemical systems, and the chemical systems are classified by components of positive electrode active materials of the battery cells.

2. The battery module (4) according to claim 1, wherein $1.01 \times A_1/A_2 \leq X_2 \leq 1.20$.

3. The battery module (4) according to claim 1, wherein Type 1a battery charge balance rate of the Type 1 battery cells, denoted as $X_1$, satisfies $0.9 \leq X_1 \leq 1.3$; and/or,
   a battery charge balance rate of the Type 2 battery cells, denoted as $X_2$, satisfies $0.8 \leq X_2 \leq 1.25$.

4. The battery module (4) according to claim 1, wherein $A_2/A_1 \leq 1.2$.

5. The battery module (4) according to claim 1, wherein the Type 1 battery cells satisfies at least one of the following conditions:
   (1) a mass $WA_1$ of an active material per unit area of a negative electrode plate of the Type 1 battery cells is 60 $\mu g/mm^2 \leq WA_1 \leq 170$ $\mu g/mm^2$;
   (2) a charge capacity per gram $BA_1$ of the negative electrode plate of the Type 1 battery cells is 320 $mAh/g \leq BA_1 \leq 380$ $mAh/g$;
   (3) a mass $WB_1$ of an active material per unit area of a positive electrode plate of the Type 1 battery cells is 120 $\mu g/mm^2 \leq WB_1 \leq 280$ $\mu g/mm^2$;
   (4) a charge capacity per gram $BC_1$ of the positive electrode plate of the Type 1 battery cells is 100 $mAh/g \leq BC_1 \leq 230$ $mAh/g$.

6. The battery module (4) according to claim 1, wherein the Type 2 battery cells satisfies at least one of the following conditions:
   (1) a mass $WA_2$ of an active material per unit area of a negative electrode plate of the Type 2 battery cells is 60 $\mu g/mm^2 \leq WA_2 \leq 170$ $\mu g/mm^2$;
   (2) a charge capacity per gram $BA_2$ of the negative electrode plate of the Type 2 battery cells is 320 $mAh/g \leq BA_2 \leq 380$ $mAh/g$;
   (3) a mass $WB_2$ of an active material per unit area of a positive electrode plate of the Type 2 battery cells is 120 $\mu g/mm^2 \leq WB_2 \leq 280$ $\mu g/mm^2$;
   (4) a charge capacity per gram $BC_2$ of the positive electrode plate of the Type 2 battery cells is 100 $mAh/g \leq BA_2 \leq 230$ $mAh/g$.

7. The battery module (4) according to claim 1, wherein, in the battery module, the number of the Type 1 battery cells is $n_1$, the number of the Type 2 battery cells is $n_2$, and the $n_1$ and the $n_2$ are natural numbers and satisfy at least one of the following conditions:

$$0.01 \leq n_1/n_2 \leq 100; \tag{1}$$

$$10\% \leq n_2 \times A_2/(n_1 \times A1 + n_2 \times A_2) \leq 60\%. \tag{2}$$

8. The battery module (4) according to claim 1, wherein the chemical systems of the Type 1 battery cells and the Type 2 battery cells are independently selected from one of a lithium nickel cobalt manganese system, a lithium iron phosphate system, a lithium iron vanadium phosphate system, a lithium vanadium phosphate system, a lithium cobaltate system, a lithium nickelate system, a lithium-rich manganese system, a lithium nickel cobalt aluminum system, and a lithium manganate system.

9. A battery pack (1), comprising the battery module (4) according to claim 1.

10. An apparatus, comprising the battery module (4) according to claim 1, wherein the battery module (4) is used to provide power supply for the apparatus and/or used as an energy storage unit of the apparatus.

11. An apparatus, comprising the battery pack (1) according to claim 9, wherein the battery pack (1) is used to provide power supply for the apparatus and/or used as an energy storage unit of the apparatus.

12. A method for manufacturing a battery module (4), comprising the following steps:
- obtaining Type 1 battery cells and Type 2 battery cells; and
- connecting the Type 1 battery cells and the Type 2 battery cells in series to form the battery module,
- wherein the Type 1 battery cells and the Type 2 battery cells satisfy the following criteria:

$$1.01 \times A_1/A_2 \leq X_2 \leq 1.25, \text{ and } A_1 < A_2,$$

where $X_2$ is a battery charge balance rate of the Type 2 battery cells; and $A_1$ and $A_2$ are respectively capacities of the Type 1 battery cells and the Type 2 battery cells,
- wherein the Type 1 battery cells and the Type 2 battery cells are physically present at the same time and work at the same time during charging and discharging,
- wherein the Type 1 battery cells and the Type 2 battery cells are battery cells of different chemical systems, and the chemical systems are classified by components of positive electrode active materials of the battery cells.

13. The manufacturing method according to claim 12, wherein
- obtaining the Type 1 battery cells and the Type 2 battery cells comprises: obtaining $n_1$ battery cells of the first type and $n_2$ battery cells of the second type, wherein the $n_1$ and the $n_2$ are natural numbers; and satisfy at least one of the following conditions:

$$0.01 \leq n_1/n_2 \leq 100; \tag{1}$$

$$10\% \leq n_2 \times A_2/(n_1 \times A1 + n_2 \times A_2) \leq 60\%. \tag{2}$$

14. The battery module (4) according to claim 1, wherein and optionally, $1.01 \times A_1/A_2 \leq X_2 \leq 1.18$.

15. The battery module (4) according to claim 1, wherein Type 1a battery charge balance rate of the Type 1 battery cells, denoted as $X_1$, satisfies $0.95 \leq X_1 \leq 1.2$; and/or, a battery charge balance rate of the Type 2 battery cells, denoted as $X_2$, satisfies $0.9 \leq X_2 \leq 1.18$.

16. The battery module (4) according to claim 1, wherein $A_2/A_1 \leq 1.1$.

17. The battery module (4) according to claim 1, wherein $A_2/A_1 \leq 1.05$.

18. The battery module (4) according to claim 1, wherein, in the battery module, the number of the Type 1 battery cells is $n_1$, the number of the Type 2 battery cells is $n_2$, and the $n_1$ and the $n_2$ are natural numbers and satisfy at least one of the following conditions:

$$0.1 \leq n_1/n_2 \leq 10; \tag{1}$$

$$10\% \leq n_2 \times A_2/(n_1 \times A1 + n_2 \times A_2) \leq 60\%. \tag{2}$$

19. The battery module (4) according to claim 1, wherein the chemical system of the Type 1 battery cells is one of a lithium nickel cobalt manganese oxide system, a lithium cobaltate system, a lithium nickelate system, a lithium-rich manganese system, a lithium nickel cobalt aluminum system, and a lithium manganate system; and/or, the chemical system of the Type 2 battery cells is one of a lithium iron phosphate system, a lithium iron vanadium phosphate system, or a lithium vanadium phosphate system.

20. The manufacturing method according to claim 12, wherein
- obtaining the Type 1 battery cells and the Type 2 battery cells comprises: obtaining $n_1$ battery cells of the first type and $n_2$ battery cells of the second type, wherein the $n_1$ and the $n_2$ are natural numbers; and satisfy at least one of the following conditions:

$$0.1 \leq n_1/n_2 \leq 10; \text{ or} \tag{1}$$

$$10\% \leq n_2 \times A_2/(n_1 \times A_1 + 2 \times A_2) \leq 60\%. \tag{2}$$

* * * * *